(12) United States Patent
Njemanze (10) Patent No.: US 7,333,999 B1
(45) Date of Patent: Feb. 19, 2008

(54) EXPRESSION EDITOR

(75) Inventor: Hugh S. Njemanze, Los Altos, CA (US)

(73) Assignee: ArcSight, Inc., Cupertino, CA (US)

( * ) Notice: Subject to any disclaimer, the term of this patent is extended or adjusted under 35 U.S.C. 154(b) by 259 days.

(21) Appl. No.: 10/698,814

(22) Filed: Oct. 30, 2003

(51) Int. Cl.
*G06F 17/00* (2006.01)
(52) U.S. Cl. ...................... 707/102; 715/700
(58) Field of Classification Search ............. 707/3, 707/4; 709/223; 726/11; 715/522
See application file for complete search history.

(56) References Cited

U.S. PATENT DOCUMENTS

| 5,187,789 | A | * | 2/1993 | O'Hair ........................... 707/4 |
| 5,321,837 | A | * | 6/1994 | Daniel et al. ................... 707/4 |
| 5,717,919 | A |   | 2/1998 | Kodavalla et al. |
| 6,134,664 | A |   | 10/2000 | Walker |
| 6,192,034 | B1 |  | 2/2001 | Hsieh et al. |
| 6,263,328 | B1 | * | 7/2001 | Coden et al. ................... 707/3 |
| 6,301,613 | B1 | * | 10/2001 | Ahlstrom et al. ........... 709/223 |
| 6,321,338 | B1 |  | 11/2001 | Porras et al. |
| 6,408,391 | B1 |  | 6/2002 | Huff et al. |
| 6,408,404 | B1 |  | 6/2002 | Ladwig |
| 6,484,203 | B1 |  | 11/2002 | Porras et al. |
| 6,484,261 | B1 | * | 11/2002 | Wiegel ........................ 726/11 |
| 6,694,362 | B1 |  | 2/2004 | Secor et al. |
| 6,704,874 | B1 |  | 3/2004 | Porras et al. |
| 6,708,212 | B2 |  | 3/2004 | Porras et al. |
| 6,711,615 | B2 |  | 3/2004 | Porras et al. |
| 6,839,850 | B1 |  | 1/2005 | Campbell et al. |
| 6,966,015 | B2 |  | 11/2005 | Steinberg et al. |
| 6,988,208 | B2 |  | 1/2006 | Hrabik et al. |
| 7,043,727 | B2 |  | 5/2006 | Bennett et al. |
| 7,089,428 | B2 |  | 8/2006 | Farley et al. |
| 7,171,689 | B2 |  | 1/2007 | Beavers |
| 2002/0019945 | A1 | | 2/2002 | Houston et al. |
| 2002/0099958 | A1 | | 7/2002 | Hrabik et al. |
| 2002/0104014 | A1 | | 8/2002 | Zobel et al. |
| 2002/0147803 | A1 | | 10/2002 | Dodd et al. |
| 2002/0184532 | A1 | | 12/2002 | Hackenberger et al. |

(Continued)

FOREIGN PATENT DOCUMENTS

WO    WO 02/045315 A2    6/2002

(Continued)

OTHER PUBLICATIONS

ARCSIGHT, "About ArcSight Team," date unknown, [online] [Retrieved on Oct. 25, 2002] Retrieved from the Internet <URL:http://www.arcsight.com/about_team.htm>.

(Continued)

*Primary Examiner*—Apu Mofiz
*Assistant Examiner*—Paul Kim
(74) *Attorney, Agent, or Firm*—Fenwick & West LLP (57) ABSTRACT

A prefix expression tree showing an expression can be supplemented to also display the expression in infix notation. In one embodiment, the present invention includes displaying an expression being capable of representation in infix and prefix notation in prefix expression tree format. In one embodiment, the expression includes a plurality of operators and operands, and the plurality of operands make up the leaves of the expression tree. In one embodiment, the present invention further includes inserting a plurality of infix operators corresponding with the plurality of operators into the prefix expression tree, wherein, the plurality of operands and infix operators represent the expression in infix notation.

23 Claims, 6 Drawing Sheets

U.S. PATENT DOCUMENTS

| | | |
|---|---|---|
| 2003/0093514 A1 | 5/2003 | Valdes et al. |
| 2003/0093692 A1 | 5/2003 | Porras |
| 2003/0101358 A1 | 5/2003 | Porras et al. |
| 2003/0188189 A1 | 10/2003 | Desai et al. |
| 2003/0221123 A1 | 11/2003 | Beavers |
| 2004/0010718 A1 | 1/2004 | Porras et al. |
| 2004/0024864 A1 | 2/2004 | Porras et al. |
| 2004/0044912 A1 | 3/2004 | Connary et al. |
| 2004/0221191 A1 | 11/2004 | Porras et al. |
| 2005/0027845 A1 | 2/2005 | Seoor et al. |
| 2005/0204404 A1 | 9/2005 | Hrabik et al. |
| 2006/0069956 A1 | 3/2006 | Steinberg et al. |

FOREIGN PATENT DOCUMENTS

| | | |
|---|---|---|
| WO | WO 02/060117 A1 | 8/2002 |
| WO | WO 02/078262 A1 | 10/2002 |
| WO | WO 02/101988 A2 | 12/2002 |
| WO | WO 03/009531 A2 | 1/2003 |
| WO | WO 2004/019188 A2 | 3/2004 |

OTHER PUBLICATIONS

ARCSIGHT, "About Overview," Oct. 14, 2002, [online] [Retrieved on Apr. 21, 2006] Retrieved from the Internet <URL:http://web.archive.org/web/20021014041614/http://www.arcsight.com/about.htm>.

ARCSIGHT, "Contact Info," date unknown, [online] [Retrieved on Oct. 25, 2002] Retrieved from the Internet <URL:http://www.arcsight.com/contact.htm>.

ARCSIGHT, "Enterprise Coverage: Technology Architecture," date unknown, [online] Retrieved from the Internet <URL: http://www.snaiso.com/Documentation/Arcsight/arcsight_archdta.pdf>.

ARCSIGHT, "Managed Process: ArcSight Reporting System," date unknown, [online] Retrieved from the Internet <URL: http://www.snaiso.com/Documentation/Arcsight/arcsight_reportsys.pdf>.

ARCSIGHT, "Managed Process: Console-Based Management," date unknown, [online] Retrieved from the Internet <URL: http://www.snaiso.com/Documentation/Arcsight/arcsight_console.pdf>.

ARCSIGHT, "Precision Intelligence: SmartRules™ and Cross-Correlation," date unknown, [online] Retrieved from the Internet <URL: http://www.snaiso.com/Documentation/Arcsight/arcsight_correlation.pdf>.

ARCSIGHT, "Precision Intelligence: SmartAgent™," date unknown, [online] Retrieved from the Internet <URL: http://www.ossmanagement.com/SmartAgent.pdf>.

ARCSIGHT, "Product Info: Product Overview and Architecture," date unknown, [online] [Retrieved on Oct. 25, 2002] Retrieved from the Internet <URL: http://www.arcsight.com/product.htm>.

ARCSIGHT, "Product Info: 360° Intelligence Yields Precision Risk Management," date unknown, [online] [Retrieved on Oct. 25, 2002] Retrieved from the Internet <URL: http://www.arcsight.com/product_info01.htm>.

ARCSIGHT, "Product Info: ArcSight SmartAgents," Oct. 10, 2002, [online] [Retrieved on Apr. 21, 2006] Retrieved from the Internet <URL:http://web.archive.org/web/20021010135236/http://www.arcsight.com/product_info02.htm>.

ARCSIGHT, "Product Info: ArcSight Cross-Device Correlation," date unknown, [online] [Retrieved on Oct. 25, 2005] Retrieved from the Internet <URL: http://www.arcsight.com/product_info03.htm>.

ARCSIGHT, "Product Info: ArcSight Manager," date unknown, [online] [Retrieved on Oct. 25, 2002] Retrieved from the Internet <URL: http://www.arcsight.com/product_info04.htm>.

ARCSIGHT, "Product Info: ArcSight Console," date unknown, [online] [Retrieved on Nov. 15, 2002] Retrieved from the Internet <URL: http:www.arcsight.com/product_info05.htm>.

ARCSIGHT, "Product Info: ArcSight Reporting System," date unknown, [online] [Retrieved on Oct. 25, 2002] Retrieved from the Internet <URL: http:www.arcsight.com/product_info06.htm>.

ARCSIGHT, "Product Info: Enterprise Scaling," date unknown, [online] [Retrieved on Oct. 25, 2002] Retrieved from the Internet <URL: http://www.arcsight.com/product_info07.htm>.

ARCSIGHT, "Security Management for the Enterprise," 2002. [online] [Retrieved on Oct. 25, 2002] Retrieved from the Internet <URL: http:www.arcsight.com/>.

ARCSIGHT, "Technical Brief: How Correlation Eliminates False Positives," date unknown, source unknown.

Burleson, D., "Taking Advantage of Object Partitioning in OracleBi," Nov. 8, 2000, [online] [Retrieved on Ap. 20, 2004] Retrieved from the Internet <URL: http://www.dba-oracle.com/art_partit.htm>.

Derodeff, C. "Got Correlation? Not Without Normalization," 2002, [online] Retrieved from the Internet <URL: http://www.svic.com/papers/pdt/Got-Correlation_malization.pdf>.

Cheung, S. et al., "EMERALD Intrusion Incident Report 601 Message Specification," Aug. 10, 2000, System Design Laboratory, SRI International.

National Institute of Standards and Technology (NIST), "Federal Information Processing Standards Publication (FIPS PUB) 199: Standards for Security Categorization of Federal Information and Information Systems", Feb. 2004.

Haley Enterprise, "Production Systems," 2002, [online] [Retrieved on Oct. 29, 2002] Retrieved from the Internet <URL: http://www.haley.com/0072567836705810/ProductionSystems.html>.

Haley Enterprise, "The Rete Algorithm," 2002, [online] [Retrieved on Oct. 29, 2002] Retrieved from the Internet <URL: http://www.haley.com/0072567836705810/ReteAlgorithm.html>.

Haley Enterprise, "A Rules Engine for Java Based on the Rete Algorithm," 2002, [online] [Retrieved on Oct. 29, 2002] Retrieved from the Internet <URL: http://www.haley.com/0072567836705810/ReteAlgorithmForRules.html>.

Halme, L.R. et al., "AINT Misbehaving: A Taxonomy of Anti-Intrusion Techniques," 2000, [online] [Retrieved on Nov. 1, 2002] Retrieved from the Internet <URL: http://www.sans.org/newlook/resources/IDFAQ/aint.htm>.

Lindqvist, U. et al., "Detecting Computer and Network Misuse Through the Production-Based Expert System Toolset P-BEST)," Proceedings of the IEEE Symposium on Security and Privacy, Oakland, California, May 9-12, 1999.

CERT Coordination Center, "Overview of Attack Trends," 2002, [online] Retrieved from the Internet <URL: http://www.cert.org/archive/pdf/attack_trends.pdf>.

Porras, P.A. et al., "EMERALD: Event Monitoring Enabling Responses to Anomalous Live Disturbances," Oct. 1997, Proceedings of the 20th NIST-NCSC National Information Systems Security (NISS) Conference.

Porras, P.A. et al., "A Mission-Impact-Based Approach to INFOSEC Alarm Correlation," Oct. 2002, Lecture Notes in Computer Science, Proceedings: Recent Advances in Intrusion Detection, pp. 95-114, Zurich, Switzerland.

Ingargiola, G., "The Rete Algorithm," date unknown, [online] [Retrieved on Oct. 29, 2002] Retrieved from the Internet <URL: http://yoda.cis.temple.edu:8080/UGAIWWW/lectures/rete.html>.

Bruneau, G., "What Difficulties are Associated on Matching Events with Attacks. Why is Event/Data Correlation Important?," 2001, [online][Retrieved on Nov. 1, 2002] Retrieved from the Internet <URL: http://www.sans.org/newlook/resources/IDFAQ/matching.htm>.

National Institutes of Health (NIH), "Table 1: Security Categorization of Federal Information and Information Systems," revised Jul. 8, 2005, [online] [retrieved on Apr. 6, 2006] Retrieved from the Internet <URL: http://inm.cit.nih.gov/security/table1.htm>.

Wood, M., et al., "Internet-Draft: Intrusion Detection Message Exchange Requirements," Jun. 23, 2002, [online] [Retrieved on Nov. 1, 2002] Retrieved from the Internet <URL: http://www.silicondefense.com/idwg/draft-ietf-idwg-requirements-07.txt>.

Heberlein. L. T., et al., "A Method to Detect Intrusive Activity in a Networked Environment," Proceedings of the Fourteenth National Computer Security Conference, NIST/NCSC, Oct. 1-4, 1991, Washington, D.C., pp. 362-371.

Javitz, H. S., et al., "The NIDES Statistical Component Description and Justification," SRI Project 3131, Contract N00039-92-C-0015, Annual Report, A010, Mar. 7, 1994.

Jou, Y. F., et al., "Architecture Design of a Scalable Intrusion Detection System for the Emerging Network Infrastructure," MCNC, Technical Report CDRL A005, Apr. 1997.

Porras, P. A., et al., "Live Traffic Analysis of TCP/IP Gateways," Symposium on Networks and Distributed Systems Security, Internet Society, Mar. 1998.

Robinson, S. L., "Memorandum Opinion" in SRI International, Inc. v. Internet Security Systems, Inc. and Symantec Corporation (D. Del., Civ. No. 04-1199-SLR), Oct. 17, 2006.

Valdes, A., et al., "Statistical Methods for Computer Usage Anomaly Detection Using NIDES (Next-Generation Intrusion Detection Expert System)," Proceedings of the Third International Workship on Rough Sets and Soft Computing (RSSC 94), Jan. 27, 1995, San Jose, CA, pp. 306-311.

U.S. Appl. No. 60/405,921, filed Aug. 26, 2002, Gisby et al.

* cited by examiner

Fig. 7

EXPRESSION EDITOR

FIELD OF THE INVENTION

The present invention relates to expressions, and, in particular, to displaying and editing these expressions.

BACKGROUND

Various expressions, such as Boolean and arithmetic expressions, are used in computer technology. Many search engines, for example, use Boolean expressions as search terms. More lengthy and complex rules, for example those used by network security systems, are also commonly represented and created using Boolean and other expressions.

Visual tree representations are also common in computer technology. For example, directory trees are used as graphical user interfaces to display the organizational hierarchy of a directory. Expressions can also be displayed according to such a tree structure. Such a tree structure is sometimes referred to as an expression tree. Expression trees display expressions in prefix notation. Because of their inherent prefix nature, expression trees can be difficult for a human to read and edit.

SUMMARY OF THE INVENTION

A prefix expression tree showing an expression can be supplemented to also display the expression in infix notation. In one embodiment, the present invention includes displaying an expression being capable of representation in infix and prefix notation in prefix expression tree format. In one embodiment, the expression includes a plurality of operators and operands, and the plurality of operands make up the leaves of the expression tree. In one embodiment, the present invention further includes inserting a plurality of infix operators corresponding with the plurality of operators into the prefix expression tree, wherein, the plurality of operands and infix operators represent the expression in infix notation.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

Described herein is an expression editor that can represent an expression in prefix tree notation and infix notation simultaneously.

Although the present system will be discussed with reference to various illustrated examples, these examples should not be read to limit the broader spirit and scope of the present invention. For example, the examples presented herein describe distributed agents, managers and various network devices, which are but one embodiment of the present invention. The general concepts and reach of the present invention are much broader and may extend to any computer-based or network-based security system.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Boolean Expressions and Boolean Expression Trees

A Boolean expression is a statement using Boolean operators that expresses a condition that is either true or false. Some well known Boolean operators are AND, OR, and NOT. A Boolean expression thus contains operands and Boolean operators. Operands are conditions that are either true or false. For example, if the operand a is TRUE and the operand b is FALSE, then the expression (a AND b) is FALSE, since a and b are not both TRUE.

Boolean expressions are well known to persons skilled in the art. Many laypeople also encounter Boolean expressions while using Internet search engines such as Google™ and LEXIS/NEXIS™. For example the Boolean search expression (ricky AND martin AND NOT rowan) finds documents presumably related to singer Ricky Martin and unrelated to Rowan and Martin's Laugh-In.

The sample Boolean expressions above are all given in infix notation. In infix notation, the operator appears between the operands. For example, in the expression ((a AND b) OR c), the operator AND is between operands a and b, and operator OR is between operands (a AND b) and c. The parentheses indicate the order of the operations. Humans find it easy to read infix notation, which is why most mathematical expressions are expressed using such notation, e.g., 1+2.

However, machines generally use prefix notation. In prefix notation, the operator comes first, followed by the operands, e.g. +,1,2. The above expression ((a AND b) OR c) in prefix notation would be OR AND a b c. One advantage of prefix notation is that the order of operations is implicit, and parentheses are not required. In postfix notation, sometimes referred to as reverse polish notation, the operands come before the operator.

There are other expressions besides Boolean expressions that contain operators and operands, which similarly have both infix and prefix notational representations. Arithmetic expressions, for example, are not Boolean expression. They do, however, have both infix and prefix notational representations, as shown above with reference to the arithmetic expression (1+2). The present invention encompasses all expressions, both Boolean and not, that can be represented in both a prefix and an infix notation. However, for simplicity and ease of understanding, most examples described herein use Boolean expressions. Applying the principles demonstrated by these examples to non-Boolean expressions that are capable of both infix and prefix representation would be obvious to one skilled in the art.

Figure 1:
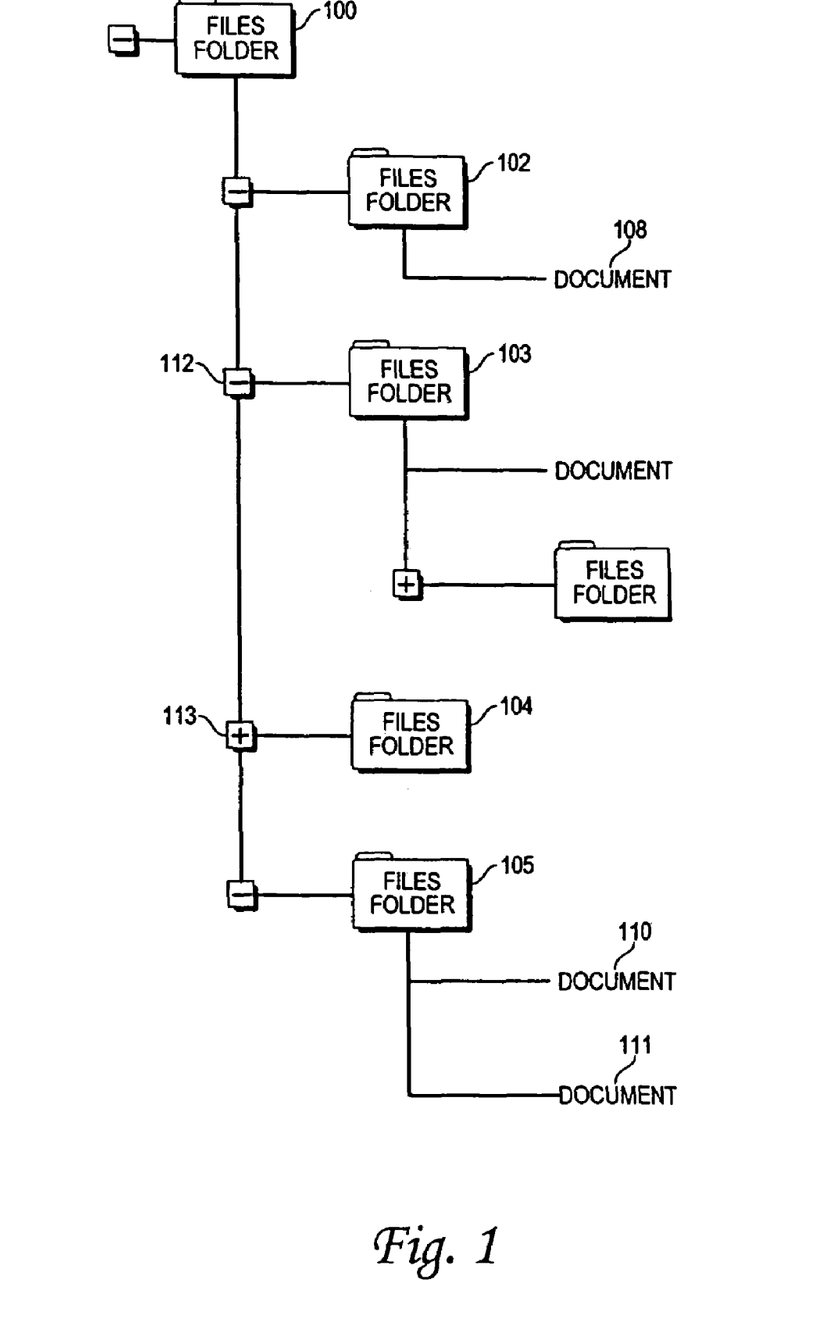
FIG. 1 is a block diagram illustrating a directory tree.

Most people encounter tree representations in everyday computing in the form of a directory tree. FIG. 1 shows a typical directory tree displaying the contents of the Files Folder 100. The Files Folder 100 contains Folders 102-105. Folder 102 contains Document 108, Folder 105 contains Documents 110-111, and so on. Expansion buttons 112-113 indicate whether the contents of a folder are displayed, and can be used to save space on a display screen. The Files Folder 100 is referred to as the root of the tree, and the documents are referred to as the leaves, since they contain no additional files.

Figure 2:
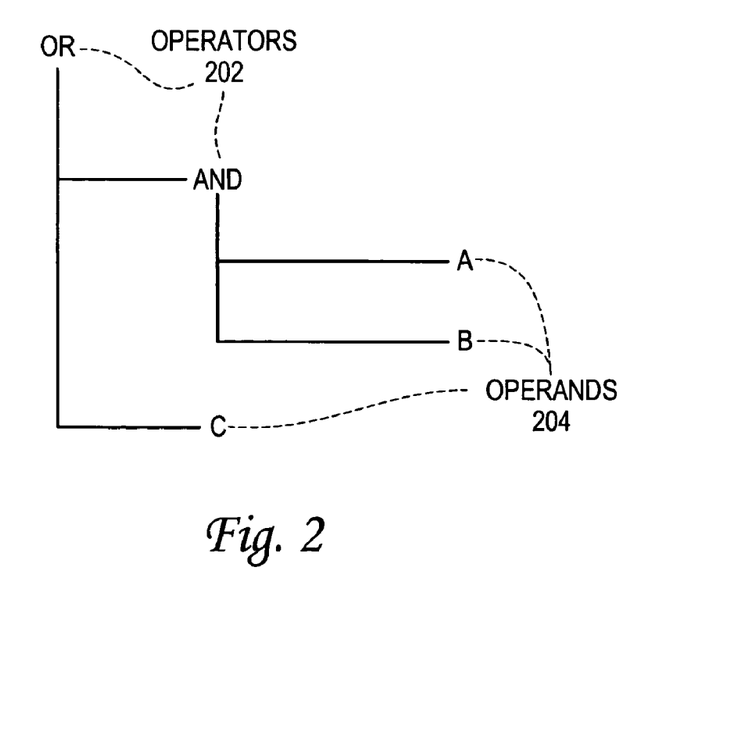
FIG. 2 is a block diagram illustrating a Boolean expression tree.

Boolean expressions can be represented in prefix notation using a similar tree structure. For example, FIG. 2 shows such a Boolean expression tree for the expression ((a AND b) OR c). The Boolean expression tree is a prefix tree. That is, reading top-to-bottom, the operators 202 appear before the operands 204.

Partly due to its prefix nature, such Boolean expression trees can be difficult for humans to read. Even such a simple expression as the one shown in FIG. 2 requires five directional reversals during reading. More complex expressions become impossible for humans to read and edit without first writing them out in infix notation.

Hybrid Infix/Prefix Boolean Expression Tree

In one embodiment, the prefix Boolean expression tree is augmented with some infix notation to make it more readable. One embodiment of how this can be done is demonstrated with reference to FIG. 3, which shows the same expression as FIG. 2. The operators 202 and the horizontal lines of the tree appear to be similar to FIG. 2. In one embodiment, the operands 204 are moved to the right of an invisible line, so that the operands 204 can be read together without reference to the tree. However, the operands 204 are still displayed on the proper connecting lines of the tree, and can still be read as part of the tree.

In one embodiment, infix operators 300 are added to the operand side of the tree, that is, on the right of the invisible line described above and shown in FIG. 3. The infix operators 300 AND and OR are inserted between the operands 204 such that when reading on the right side of the invisible line (the operand side of the Boolean expression tree) from top-to-bottom and left-to-right, the expression reads as (a AND b) OR c. Thus, the right hand side of the prefix tree can now also be read in infix notation.

Figure 3:
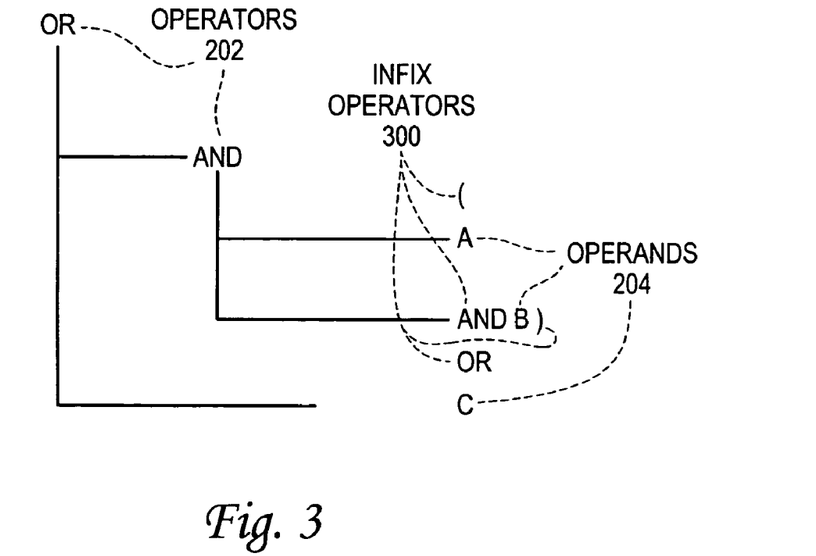
FIG. 3 is a block diagram illustrating a hybrid expression tree according to one embodiment of the present invention.

In one embodiment, the method for inserting the infix operators 300 is to copy the applicable operator 202 and insert it between the operands 204 it operates on. In FIG. 3, for example, AND is inserted between a and b. Also, OR is inserted between (a AND b) and c. In the embodiment demonstrated with reference to FIG. 3, the operands 204 have remained on the line that indicates their position on the prefix Boolean expression tree, and the insertion of the infix operators 300 was done in a manner that preserves these positions. Furthermore, in the embodiment demonstrated with reference to FIG. 3, the operands 204 all appear on the right of an invisible line dividing the Boolean expression tree from the operands 204. This can make the infix operand side of the expression tree easier to read once the infix operators 300 have been inserted.

Example Rules Editor

One embodiment of the present invention is now demonstrated in the context of a computer security system. A computer security system can analyze events and alarms from various network security products. Network security products largely include Intrusion Detection Systems (IDSs), which can be Network or Host based (NIDS and HIDS respectively). Other network security products include firewalls, router logs, and various other event reporting devices. An example network security system is now described with reference to FIG. 4.

Figure 4:
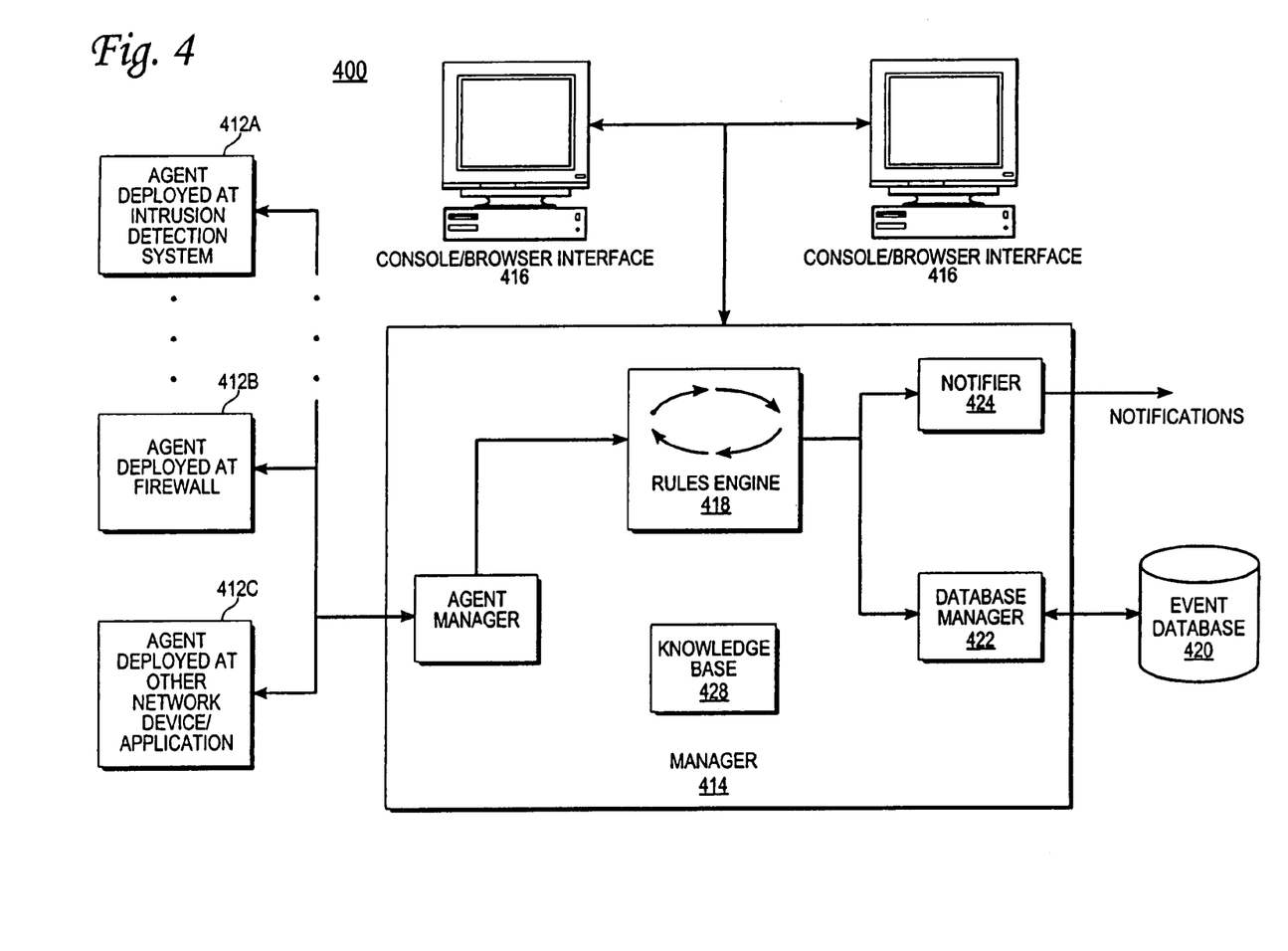
FIG. 4 is a block diagram illustrating a network security system in which embodiments of the present invention may be implemented.

In FIG. 4, an example of a computer-based system 400 architected in accordance with an embodiment of the present invention is illustrated. System 400 includes agents 412A 412B, 412C, one or more managers 414 and one or more consoles 416 (which may include browser-based versions thereof). In some embodiments, agents, managers and/or consoles may be combined in a single platform or distributed in two, three or more platforms (such as in the illustrated example). The use of this multi-tier architecture supports scalability as a computer network or system grows.

Agents 412A 412B, 412C are software programs that provide efficient, real-time (or near real-time) local event data capture and filtering from a variety of network security devices and/or applications. The primary sources of security events are common network elements including firewalls, intrusion detection systems and operating system logs. Agents 412A, 412B, 412C can collect events from any source that produces event logs or messages and can operate at the native device, at consolidation points within the network, and/or through simple network management protocol (SNMP) traps.

Managers 414 are server-based components that further consolidate; filter and cross-correlate events received from the agents, employing a rules engine 418 and a centralized event database 420. One role of manager 414 is to capture and store all of the real-time and historic event data to construct (via database manager 422) a complete, enterprise-wide picture of security activity. The manager 414 also provides centralized administration, notification (through one or more notifiers 424), and reporting, as well as a knowledge base 428 and case management workflow. The manager 414 may be deployed on any computer hardware platform and one embodiment utilizes a relational database management system such as an Oracle™ database to implement the event data store component. Communications between manager 414 and agents 412A, 412B, 412C may be bi-directional (e.g., to allow manager 414 to transmit commands to the platforms hosting agents 412A, 412B, 412C) and encrypted.

Consoles 416 are computer- (e.g., workstation-) based applications that allow security professionals to perform day-to-day administrative and operation tasks such as event monitoring, rules authoring, incident investigation and reporting. Access control lists allow multiple security professionals to use the same system and event database, with each having their own views, correlation rules, alerts, reports and knowledge base appropriate to their responsibilities. A single manager 414 can support multiple consoles 416.

In some embodiments, a browser-based version of the console 416 may be used to provide access to security events, knowledge base articles, reports, notifications and cases. That is, the manager 414 may include a web server component accessible via a web browser hosted on a personal or handheld computer (which takes the place of console 416) to provide some or all of the functionality of a console 416. Browser access is particularly useful for security professionals that are away from the consoles 416 and for part-time users. Communication between consoles 416 and manager 414 is bi-directional and may be encrypted.

As mentioned above, the console interface 416 can be used to author rules for the rules engine 418 or the manager 414. In one embodiment, these rules take the form of Boolean expressions. For example a rule representing a successful brute force attack can be ((ten unsuccessful logon attempts) AND (successful logon from same IP address)).

The consoles 416 can similarly be used to author and edit other Boolean expressions, such as rules that control filters. In one embodiment, the rule viewer/editor that creates the user interface to view and edit the rules on the consoles 416 uses a hybrid prefix/infix Boolean expression tree of the variety described with reference to FIG. 3. An example rule as displayed by such a display/editor is described with reference to FIG. 6. To contrast, the example rule is first shown as a pure prefix expression tree in FIG. 5.

Figure 5:
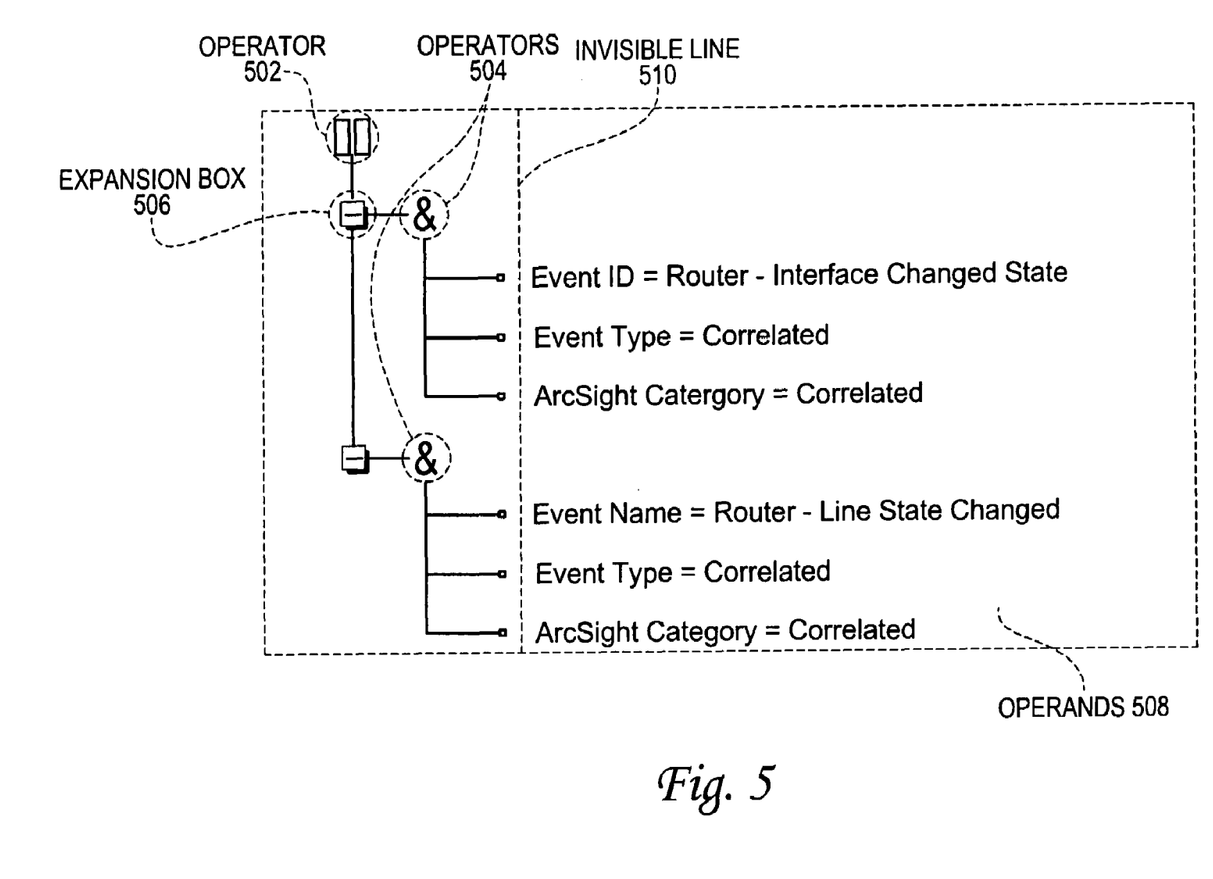
FIG. 5 is a block diagram illustrating a rule viewed as an expression tree according to one embodiment of the present invention.
Figure 6:
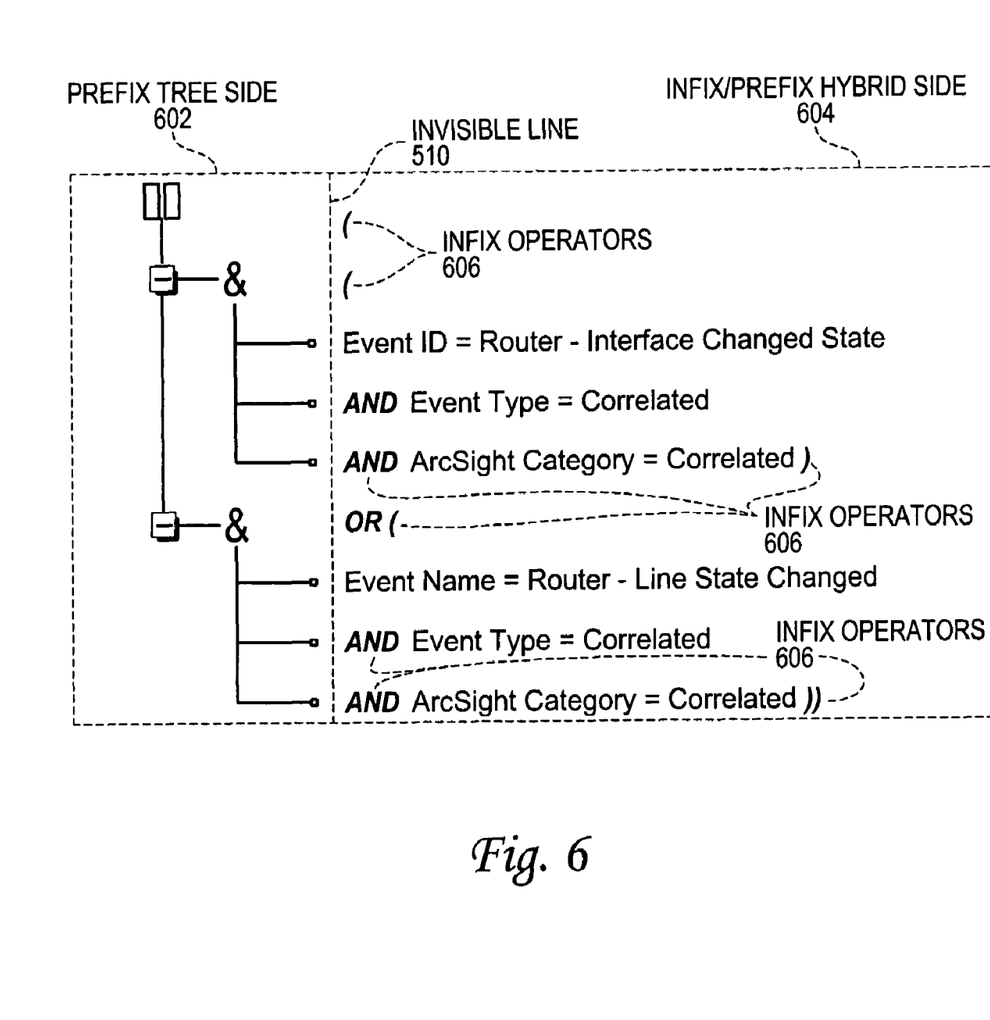
FIG. 6 is a block diagram illustrating a rule viewed as a hybrid expression tree according to one embodiment of the present invention.

The rule displayed in FIGS. 5 and 6 is the definition of "State," a sub-rule in the rule "Matching Event," that can be used to detect matching events. The entire rule can be seen on the sample rule editor shown in the screenshot in FIG. 7. The State is defined by a Boolean expression so that State is TRUE if the event identifier identifies the event as the Router-Interface Changed State (Event ID=Router-Interface Changed State), the event is a correlated type event (Event Type=Correlated), and, according to the proprietary Arc-Sight™ classification, the event is in the correlated category (ArcSight Category=Correlated). In the alternative, State is also TRUE if the name of the event is "Router-Line State Changed" (Event Name=Router-Line State Changed), the event is a correlated type event (Event Type=Correlated), and the event is in the correlated category (ArcSight Category=Correlated). If neither of the previous two sentences is TRUE, then the State is FALSE.

In infix notation State is: ((Event ID=Router-Interface Changed State AND Event Type=Correlated AND ArcSight Category=Correlated) OR (Event Name=Router-Line State Changed AND Event Type=Correlated AND ArcSight Category=Correlated)). FIG. 5 shows this expression as it appears using a prefix Boolean expression tree arranged in a visually pleasing format. In this embodiment, the operators are represented in graphical form. That is, operator 502 stands for OR—in the commonly used graphical representation as ∥—and operators 504 stand for AND—in the commonly used graphical representation as &. In other embodiments, these operators can be in a language format, such as English. The expansion boxes 506 can be used to simplify the tree by hiding the operands 508 of the operators 504.

The operands 508 are aligned to the left on the right side of the invisible line 510 discussed above. An operand, such as Event Type=correlated, is TRUE or FALSE depending on whether the stated condition is true or false. Such a graphical representation can be very useful and convenient. However, it is difficult to read the rule out loud without first writing it in infix notation. More complicated and lengthy rules become almost impossible to decipher by a human looking at the prefix Boolean expression tree.

FIG. 6 shows how the above rule can be converted into infix notation, while keeping it in the context of the prefix Boolean expression tree. Since FIG. 6 contains many of the same visual elements as FIG. 5, those elements already labeled in FIG. 5 are not labeled and described again for clarity, visual simplicity, and ease of understanding. In FIG. 6, on the left hand of the invisible line 510 is the prefix tree side 602 of the Boolean expression tree, which is identical to the left side of the tree in FIG. 5.

However, to the right of the invisible line 520 is now the infix/prefix hybrid side 604 of the Boolean expression tree. On this side, the operands 508 are still part of the Boolean expression tree. The operands are still on their appropriate vertical lines, such that they remain connected to the prefix Boolean expression tree. However, infix operators 606 have been inserted, so that when read from left-to-right and top-to-bottom (in the manner readers of English and many other languages commonly read), the expression reads as an infix notation expression. In this embodiment, the infix operators 606 are inserted textually in English/language representation as opposed to symbolically in graphical notation; for example AND instead of &, but in other embodiments graphical equivalents or other languages can be used.

In one embodiment, the method for inserting the infix operators 606 can be established according to the following rules. Each operator on the prefix tree side 602 has an open parenthesis on the same line on the infix/prefix hybrid side 604. Furthermore, excluding the first operand of each operator, every operand has the operator inserted as an infix operator 606 in front of the operand. For example, Event Type=Correlated is the third operand of the first &. Thus, the infix operator AND is inserted in front of it on the infix/prefix hybrid side 604. Similarly, (Event Name=Router-Line State Changed AND Event Type=Correlated AND ArcSight Category=Correlated) is the second operand of the ∥ operator, thus, the infix operator OR is inserted in front of it. Close parentheses are inserted at the end of each operand list to coincide with the open parentheses.

It can be seen with reference to FIG. 6, that following the above rules results in the infix operators 606 always being inserted between the operands when read in the usual left-to-right and top-to-bottom manner. Furthermore, the parentheses are also always properly inserted to indicate the order of the operations implicit in the Boolean expression tree. Furthermore, the operands 508 remain part of the prefix tree, while also readable in infix notation.

Figure 7:
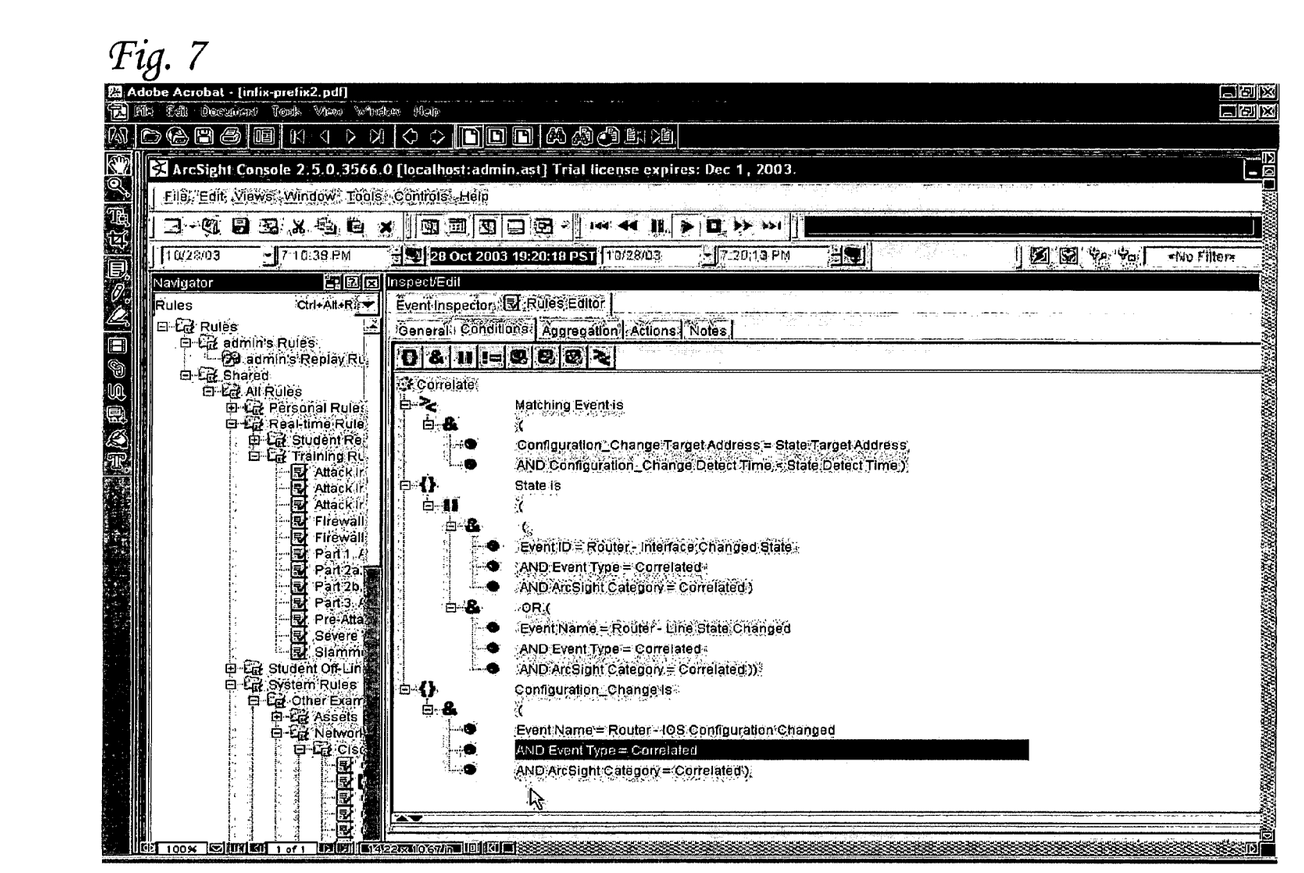
FIG. 7 is a screenshot of a rule viewer/editor according to one embodiment of the present invention.

FIG. 7 shows one embodiment of how a rule editor can use the infix/prefix hybrid Boolean expression tree described above. FIG. 7 is a screenshot from such a rule editor that appears in the Inspect/Edit window. FIG. 7 displays the entire Matching Event rule, a part of which was used above. In one embodiment, if a user wants to edit a rule, then he or she can do so from either the graphical prefix tree side, or from the English language hybrid prefix/infix side. In other words, if on the hybrid side an AND is changed to OR for example, the graphical Boolean expression tree is updated and restructured to reflect the change. Conversely, if the || is changed to & for example, the hybrid prefix/infix side is also updated to reflect the change.

Thus, a prefix/infix hybrid expression tree, and a rule inspector/editor that uses such a structure have been described. In the foregoing description various specific modules, such as the "Consoles," have been described. However, these names are merely to describe and illustrate various aspects of the present invention, and in no way limit the scope of the present invention. Furthermore, the present invention is not limited to use as a rule editor in a network security system, but can be used to view and edit any expression that has both an infix and a prefix representation.

The present invention is not limited to displaying and editing Boolean expressions. In the foregoing description, the various examples and embodiments were meant to be illustrative of the present invention and not restrictive in terms of their scope. Accordingly, the invention should be measured only in terms of the claims, which follow.

The invention claimed is:

1. A computer-implemented method for editing an expression, comprising:
 displaying a graphical representation of a tree that represents the expression, containing:
  a root node that includes a first operator of the expression;
  a plurality of internal nodes that include a plurality of operators of the expression; and
  a plurality of leaf nodes that include a plurality of operands of the expression;
 displaying a plurality of symbols, adjacent to the plurality of operands in the tree, the plurality of symbols and the plurality of operands representing the expression in infix notation;
 receiving user input indicating a change to a first portion of a user interface;
 updating a second portion of the user interface based on the received user input; and
 displaying the updated second portion of the user interface.

2. The method of claim 1, further comprising displaying an expansion box, associated with an operator, configured to toggle between showing or hiding operands of the associated operator.

3. The method of claim 1, wherein the first portion includes the plurality of operators, and wherein the second portion includes the plurality of operands and the plurality of symbols.

4. The method of claim 3, wherein the change to the first portion includes one of an insertion of an operator and a deletion of an operator.

5. The method of claim 3, wherein updating the second portion includes changing a symbol.

6. The method of claim 1, wherein the first portion includes the plurality of operands and the plurality of symbols, and wherein the second portion includes the plurality of operators.

7. The method of claim 6, wherein the change to the first portion includes one of an insertion of a parenthesis and a deletion of a parenthesis.

8. The method of claim 6, wherein updating the second portion includes changing the graphical representation of the tree.

9. The method of claim 1, wherein the plurality of symbols includes an open parenthesis that indicates an order of operations.

10. The method of claim 9, wherein the open parenthesis is located adjacent to an operator.

11. The method of claim 1, wherein an operator of the plurality of operators is displayed symbolically.

12. The method of claim 1, wherein an operator of the plurality of operators is displayed textually.

13. The method of claim 1, wherein the plurality of operators includes a logical operator.

14. The method of claim 1, wherein an operand of the plurality of operands includes an expression that includes a comparative operator.

15. The method of claim 1, wherein the expression comprises a Boolean expression.

16. The method of claim 1, wherein the expression comprises a rule in a computer network security system.

17. The method of claim 1, wherein the first portion and the second portion do not overlap.

18. A computer-readable medium storing instructions for editing an expression, the instructions executable by a processor for performing a set of operations comprising:
 displaying a graphical representation of a tree that represents the expression, containing:
  a root node that includes a first operator of the expression;
  a plurality of internal nodes that include a plurality of operators of the expression; and
  a plurality of leaf nodes that include a plurality of operands of the expression;
 displaying a plurality of symbols, adjacent to the plurality of operands in the tree, the plurality of symbols and the plurality of operands representing the expression in infix notation;
 receiving user input indicating a change to a first portion of a user interface;
 updating a second portion of the user interface based on the received user input; and
 displaying the updated second portion of the user interface.

19. The computer-readable medium of claim 18, wherein the first portion includes the plurality of operators, and wherein the second portion includes the plurality of operands and the plurality of symbols.

20. The computer-readable medium of claim 18, wherein the first portion includes the plurality of operands and the plurality of symbols, and wherein the second portion includes the plurality of operators.

21. A computer system for editing an expression, comprising:
 a display device configured to display:
  a graphical representation of a tree that represents the expression, containing:
   a root node that includes a first operator of the expression;
   a plurality of internal nodes that include a plurality of operators of the expression; and
   a plurality of leaf nodes that include a plurality of operands of the expression; and, additionally,
  a plurality of symbols, adjacent to the plurality of operands in the tree, the plurality of symbols and the plurality of operands representing the expression in infix notation;
 an input device configured to accept user input; and
 a processor, coupled to the display device and to the input device, configured:
  responsive to user input indicating a change to a first portion of a user interface, to update a second portion of the user interface based on the received user input.

22. The computer system of claim 21, wherein the first portion includes the plurality of operators, and wherein the second portion includes the plurality of operands and the plurality of symbols.

23. The computer system of claim 21, wherein the first portion includes the plurality of operands and the plurality of symbols, and wherein the second portion includes the plurality of operators.

\* \* \* \* \*